Nov. 3, 1964    R. W. BEMMANN    3,155,441
METHOD OF MAKING A TEFLON BEARING
Filed Nov. 15, 1961
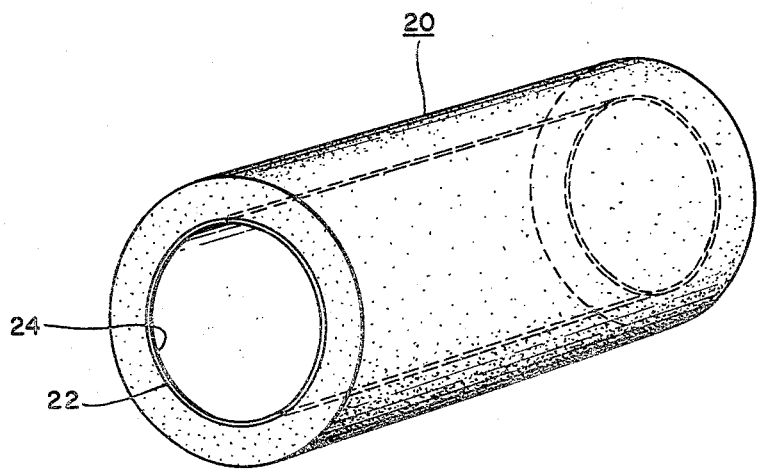
INVENTOR.
Richard W. Bemmann
BY
His Attorney

United States Patent Office 3,155,441
Patented Nov. 3, 1964

3,155,441
METHOD OF MAKING A TEFLON BEARING
Richard W. Bemmann, Flint, Mich., assignor to General Motors Corporation, Detroit, Mich., a corporation of Delaware
Filed Nov. 15, 1961, Ser. No. 152,554
6 Claims. (Cl. 308—241)

This invention relates to bearings and is particularly concerned with a porous metal bearing and a method of making the same.

Specifically, the invention is directed to a method of making a bearing which has a long lasting bearing surface thereon consisting of polytetrafluoroethylene commonly known as Teflon and so described hereinafter.

It is, therefore, an object of the invention to provide a bearing and method of making same wherein a Teflon bearing surface is provided which has longer lasting characteristics and better wearing properties than Teflon bearing surfaces heretofore provided.

The use of Teflon as a bearing surface with porous metal is admittedly old. Attention is directed, for example, to Tait Patent 2,689,380 which discloses a porous metal backing having a Teflon bearing surface wherein Teflon is pressed into the porous structure of the porous metal. In this instance the Teflon is applied as a layer which is mechanically forced into the cavities of the porous metal by heat and pressure.

Love Patent 2,731,360 also discloses the application of Teflon to a bearing surface as a lubricant material wherein the Teflon is applied in a colloidal suspension. Numerous other patents directed to similar types of bearings and methods for making same are known.

The present invention is specifically directed to an improvement in the manufacture of Teflon surfaced porous metal bearings wherein the Teflon is longer wearing and whereby the bearing life is greatly improved over anything heretofore known.

Specifically, it is an object of the invention to provide a method for pretreating the Teflon bearing surface after application thereof for improving the tear characteristics, toughness and cold flow of the plastic whereby either dry or wet bearing life is greatly enhanced.

In carrying out the above object it is a further object to treat the Teflon surface with a penetrating petroleum product after application whereby extraneous materials at the interfaces between the Teflon particles are removed.

Another object of the invention is to improve the physical structure of the Teflon surface and enhance the density of the bore thereof by sizing the porous metal bearing after impregnation thereof to further entrap the Teflon particles.

Further objects and advantages will be apparent, reference being had to the accompanying drawing wherein a cylindrical bearing is depicted.

While the description to follow will be relating to the drawing, it is understood that other physical structures may be used wherein the present invention offers improved bearing characteristics. The drawing shows a sintered porous metal bearing 20 having a bore 22 therein which bore is coated with Teflon 24. The Teflon particles in the layer extend into the pores of the porous metal and are mechanically held thereto. It is apparent that the benefits will be derived if the porous metal is in the form of a layer bonded to a steel or other metal backing. Also, half bearings, thrust washers and the like may all be prepared as set forth hereinafter whereby the term bearing is used in its generic sense.

Specifically, porous metal bearings may be made by any of the well known practices such as mixing various metal powders, for example tin and copper, nickel and copper, iron and carbon, etc. The mixture is briquetted into a self sustaining mass at pressures ranging between 15,000 and 75,000 lbs. per square inch and is then sintered under non-oxidizing conditions at a temperature below the melting point of the predominant metal powder and generally above the melting point of the metal powder in minor proportions. In the case of predominantly copper material utilizing tin as a secondary metal, temperatures in the order of 1550° F. to 1750° F. are satisfactory. In nickel-copper mixtures, temperatures in the order of 2000° F. to 2050° F. are useful, said temperatures being above the melting point of copper and below the melting point of the predominant nickel powder. Iron-graphite mixtures wherein the graphite ranges in the order of from 1% to 2% by weight may be sintered at a temperature of about 2050° F. All of these practices are well known and form no part of this invention.

After the porous metal bearing is formed and sintered it is treated at the bearing surface thereof with a Teflon lacquer. These lacquers for the most part are water suspensions and very fine Teflon particles and may be sprayed, brushed or otherwise applied to the bearing surface. Thereafter the carrier is evaporated and the Teflon particles remain in a more or less continuous phase within the pores of and on the surface of the porous metal.

Next, and most important with respect to the present invention, I then treat the bearing with the Teflon surface thereon by dipping the same in an organic solvent. Such solvents as toluene, xylene, isoprene, benzene, diisobutylene, Stanisol, etc., are all satisfactory. It is my theory that the organic solvent dip conditions the surface of the Teflon particles so that the particles tend to adhere to one another more firmly during subsequent sizing and use. This treatment also improves tear resistance which is an important factor during the subsequent sizing step. I have also found that the use of the dip definitely improves the overall life of these bearings.

The treated bearing is next sized. This sizing or coining is performed by passing a positioning rod within the bore of the bearing and then sizing the bearing to length. This causes the porous metal to densify, particularly adjacent the bearing surface and mechanically grip the Teflon particles which have found their way into the surface pores. This forms a strong mechanical bond which holds the Teflon particles to the surface.

Identical tests run on porous bronze material of the same composition, each coated with Teflon under identical control conditions, wherein one bearing was treated with the organic solvent and the other was not, showed the treated bearing still operating at 6,000 hours while the untreated bearing had failed after about 2600 hours. Thus, the bearing life by treatment in the solvent was improved almost three times at the conclusion of the test which in itself was not carried over a sufficient length of time to cause ultimate bearing failure.

Specifically, the test run was made on bearings fabricated from a mixture of 90% copper and 10% tin using a briquetting pressure in the order of 25,000 lbs. per square inch. The bearing was sintered in a reducing atmosphere at about 1500° F. for 30 minutes. The inner diameter of the bearing was then coated with Teflon enamel and thereafter a rod having a diameter of about .0010, undersized with reference to the bore, was run through the bore to clear the excess enamel therefrom. Thereafter, the bearing with the enameled bore was dried at about 200° F. for 30 minutes and was then fired at 750° F. for 10 minutes. The bearing is next treated at the surface with Stanisol (an inhibited kerosene), gasoline, or some other suitable organic solvent as noted herein. Next, the bearing was coined or sized to length upon a fixed mandrel to reduce the overall length slightly. In this instance a bearing, which was 1.200 inches long after sintering, was sized to reduce the length thereof to about 1.03 inches. Obviously, as the length decreases with other dimensions being the same, the density of the part increases and locks the Teflon in place within the surface pores thereof.

Another example contemplates mixing copper, tin, and lead in proportions of 85, 10 and 5 parts by weight. The briquetting and sintering was carried out as heretofore described. The Teflon varnish used as an impregnant was a commercial grade of varnish sold by Du Pont and sold under the trade name of Teflon 30 Dip Coating Material. This is an aqueous dispersion of Teflon particles. The impregnation of the bearing was carried out by dipping or painting the dispersion over the surface of the bearing to be treated. Thereafter, the bearing was dried to eliminate the aqueous vehicle and was then heated or fired to harden the Teflon. This was accomplished at temperatures in the order of 650° F. to 750° F. The bearing surface was then conditioned by dipping the bearing in benzene and allowing the benzene to evaporate in air. Thereafter, the bearing was sized to further entrap the Teflon within the surface pores thereof. The sizing was carried out on the exterior of the bearing holding the inner bore constant.

The foregoing examples are given for exemplary purposes only since the art is well developed with respect to the manufacture of porous metal bearings. This invention, as noted heretofore, is directed in its entirety to the very important steps of lubricating the bearing with the organic solvent for increasing the life of the Teflon coating and for improving its tear and anti-frictional characteristics and thereafter coining the bearing to lock the treated high-tear resistant Teflon in the surface pores thereof.

It is understood that the lubricating and coining steps may be reversed if tear resistance is not important, although for obvious reasons the disclosed order of steps is generally preferred. Also, it is to be understood that the coining or sizing operation may be carried out without fully evaporating the lubricating solvent, all of these variations coming within the scope of my invention.

While the embodiments of the present invention as herein disclosed, constitute preferred forms, it is to be understood that other forms might be adopted.

What is claimed is as follows:

1. The process for making a bearing having a Teflon bearing surface and a porous metal backing, the steps comprising; forming a porous metal bearing member, treating the surface thereof with a Teflon enamel, heating the bearing with the Teflon enamel thereon to a temperature in the order of 750° F. for hardening the Teflon, treating the bearing with an organic solvent for improving the wear and tear resistance thereof and finally sizing the bearing while holding the inner diameter substantially constant for closing the surface pores at the bearing surface and further entrapping the Teflon therein.

2. The process for making a bearing having a Teflon bearing surface and a porous metal backing, the steps comprising; forming a porous metal bearing member, treating the surface thereof with a Teflon enamel, drying the bearing with the enameled bore at about 200° F. then firing the bearing at about 750° F., immersing the bearing in organic solvent for improving the life of the Teflon coating and for increasing its anti-frictional qualities and finally coining the bearing while holding the bore substantially constant in diameter for improving the bond of the Teflon to the bearing.

3. The process for making a bearing having a Teflon lubricated bearing surface carried on a porous metal surface, the steps comprising coating and impregnating a porous metal bearing surface with Teflon particles in a liquid vehicle, eliminating the vehicle to provide Teflon particles in and on the bearing surface, treating said bearing surface with an organic solvent for increasing the life and improving the anti-frictional properties of the Teflon and finally coining the porous metal at the bearing surface to mechanically lock the Teflon particles in place.

4. The process for making a bearing having a Teflon lubricated bearing surface carried on a porous metal surface, the steps comprising; coating and impregnating a porous metal bearing surface with Teflon particles in a liquid vehicle, eliminting the vehicle to provide Teflon particles in and on the bearing surface, sintering the Teflon for consolidating the coating, treating said bearing surface with an organic solvent for increasing the life and improving the anti-frictional properties of the Teflon and finally coining the porous metal at the bearing surface to mechanically lock the Teflon particles in place.

5. The process for making a bearing having a Teflon lubricated bearing surface carried on a porous metal surface, the steps comprising; coating and impregnating a porous metal bearing surface with Teflon particles in a liquid vehicle, eliminating the vehicle to provide Teflon for consolidating the coating, and then treating said bearing surface with an organic solvent for increasing the life and improving the anti-frictional properties of the Teflon.

6. A porous metal bearing including Teflon at the bearing surface thereof as a lubricant coating, and Teflon being heat treated and mechanically locked within the pores of the porous metal, said Teflon being treated with an organic solvent taken from the class consisting of toluene, xylene, isoprene, benzene, di-isobutylene, inhibited kerosene and gasoline subsequent to the heat treatment thereof for improving the anti-frictional qualities and tear resistance of the Teflon.

References Cited in the file of this patent

UNITED STATES PATENTS

| | | |
|---|---|---|
| 2,689,380 | Tait | Sept. 21, 1954 |
| 2,798,005 | Love | July 2, 1957 |
| 2,995,462 | Mitchell et al. | Aug. 8, 1961 |